(12) United States Patent
Kammerer et al.

(10) Patent No.: US 7,000,899 B2
(45) Date of Patent: Feb. 21, 2006

(54) SHUTOFF DEVICE

(75) Inventors: Bernd Kammerer, Gladbach (DE);
Hans Adams, Cologne (DE)

(73) Assignee: Erben Kammerer KG, (DE)

( * ) Notice: Subject to any disclaimer, the term of this patent is extended or adjusted under 35 U.S.C. 154(b) by 316 days.

(21) Appl. No.: 10/462,685

(22) Filed: Jun. 17, 2003

(65) Prior Publication Data

US 2005/0167630 A1  Aug. 4, 2005

(30) Foreign Application Priority Data

Jun. 17, 2002  (DE) .................. 202 09 420 U

(51) Int. Cl.
*F16K 3/00*  (2006.01)
(52) U.S. Cl. .............. 251/327; 251/328; 251/329; 251/368
(58) Field of Classification Search .......... 251/327, 251/328, 329, 368
See application file for complete search history.

(56) References Cited

U.S. PATENT DOCUMENTS 5,829,735 A * 11/1998 Ikeda .................. 251/368
6,454,015 B1 * 9/2002 Armstrong et al. ......... 166/387
6,691,981 B1 * 2/2004 Hart ................... 251/302

* cited by examiner

*Primary Examiner*—Justine R. Yu
*Assistant Examiner*—Peter deVore
(74) *Attorney, Agent, or Firm*—Diller, Ramik & Wight

(57) ABSTRACT

A shutoff device for shutting off liquids or gases comprises a device housing (10) and a device (13) movable in said housing (10), the device (13) being provided with an opening (14). For sealing purposes, annular sealing bodies (28) are provided which are supported in annular fluid cylinders (27). The contact surfaces (34) are coated with a hard-material layer (37,39) which is subjected to microfinishing. The sealing bodies (28) are yieldingly supported such that they are capable of following any deformation or displacement of the device (13). The sealing is particularly suitable for aggressive and abrasive media and solids-carrying media.

11 Claims, 3 Drawing Sheets

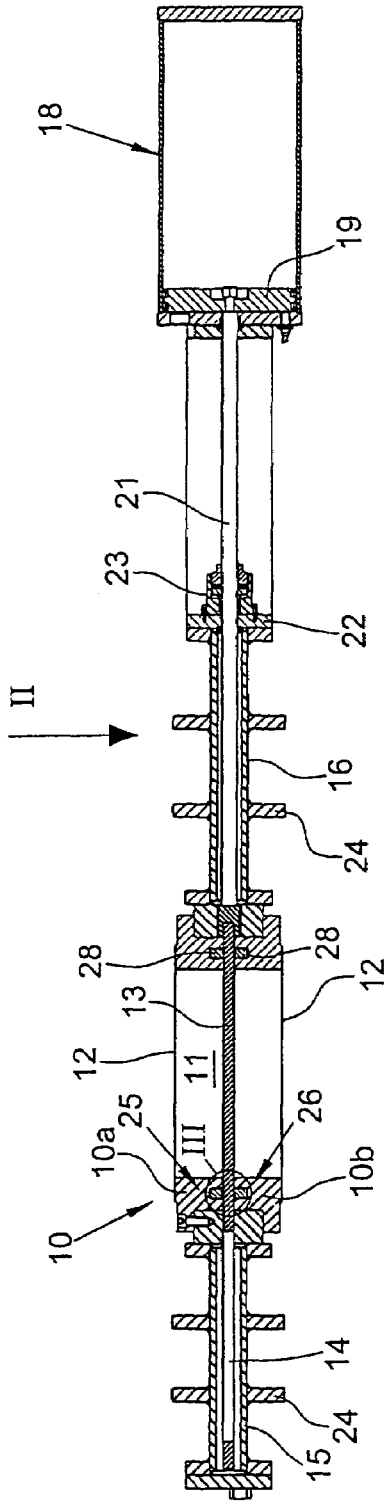
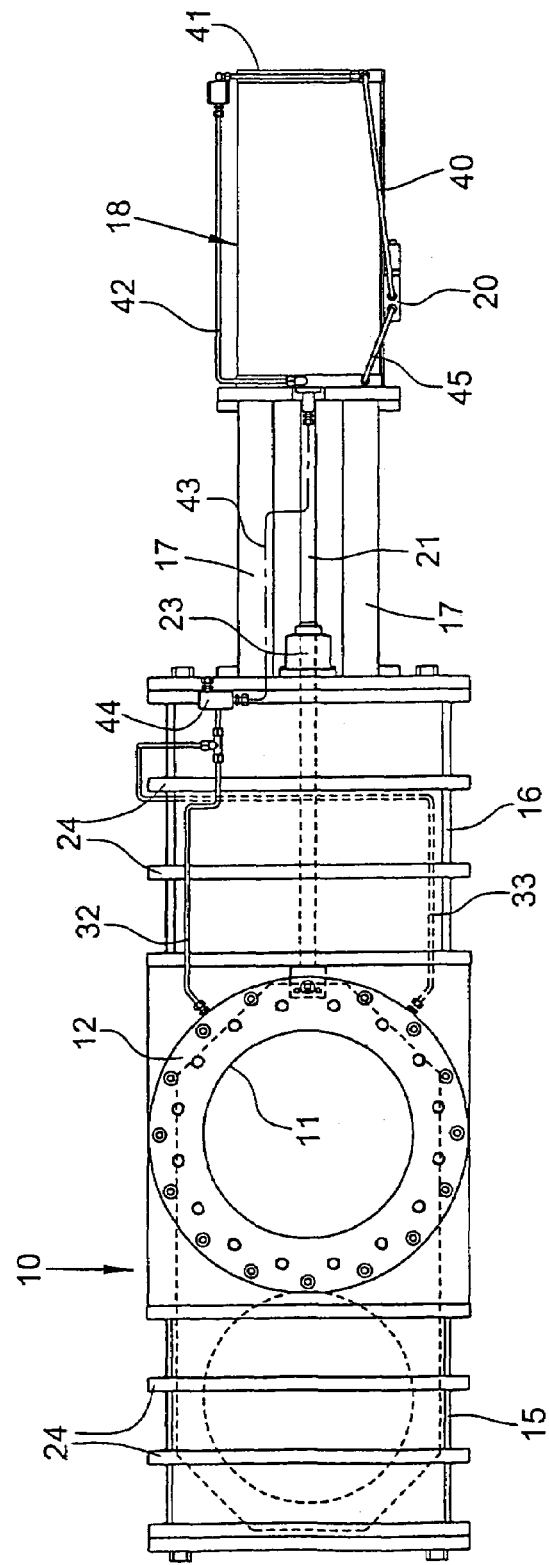

SHUTOFF DEVICE

BACKGROUND OF THE INVENTION

The invention relates to a shutoff device for shutting off conduits, said device comprising a device housing having a passage, and a device movable within said housing.

Shutoff devices serve for shutting off fluid-carrying conduits. The fluids may be gases, liquids, solids and in particular multiphase systems where e.g. solids are transported together with a gaseous or liquid carrier medium. All these materials have a wide spectrum. For example, solids ranging from granular and abrasive products to logs or stones may be transported through the conduit. The liquids and gases may be aggressive substances, e.g. an acid or any type of waste water. Further, the sizes of shutoff devices may vary within a wide range. A characteristic dimension is the diameter of the passage and/or the adjacent conduits. Frequently, the diameter has a size of approximately 40 cm.

In the device housing of a shutoff device the device is linearly movable in a guideway to be moved from the open position into the closed position. This adjustment is normally effected pneumatically or hydraulically or by means of a motor. In each of these two positions the device must be sealed towards the passage to prevent the medium from uncontrolledly escaping at the shutoff device. Normally, the device is sealed by means of annular soft seals. These seals are made of graphite, PTFE filled with graphite (Manoy) or electrocoal. Such seals are rapidly destroyed by problematic media, i.e. by mechanical action, such as abrasion, or chemical or thermal action. Although the seals are arranged at a distance to the circumference of the passage they are exposed to the medium.

For improving the seals, shutoff devices have been developed which are provided with fluid cylinders in the device housing, said fluid cylinders including annular sealing bodies. Each sealing body is provided with a soft seal at the surface facing the device, said soft seal pressing against the device. This is designed to compensate for any wear of the soft seals, and it is ensured that the annular pistons are always pressed with an adequate pressure force against the device.

SUMMARY OF THE INVENTION

It is an object of the invention to provide a shutoff device which does not show essential wear and whose tightness does not decrease even when it is exposed to problematic fluids. In other words, it is an object of the invention to prolong the service life of the seal.

This object is achieved with the features of claim 1. Accordingly, sealing is provided between rigid sealing bodies which are included in the fluid cylinders and supported by the fluid, and the device, wherein the cooperating contact surfaces are provided with a hard-material layer which is harder than the device material and whose surface has a roughness of less than 10 $\mu$m. This means that the sealingly abutting surfaces have a large hardness and a large evenness such that they snugly bear against each other without any inclusions. This hard-material seal is used in combination with yieldingly pressing the sealing bodies against the device. This means that the device is allowed to move transversely to the device plane or to deform without the sealing action being affected. This movability is due to the fact that the annular sealing bodies are configured as pistons to which either a gas (compressed air) or a liquid is applied. When a liquid is applied, a gas pressure storage means is to be provided because of the incompressibility of the liquid in order to attain the necessary yielding capability of the pressure force.

The hard-material layer is preferably made from a ceramic-bonded or metal-bonded carbide or oxide. Such hard-material coatings are known per se and need not be explained in detail. For example, silicon carbide or silicon oxide are suitable materials.

The surface roughness of the hard-material layers is preferably smaller than 2 $\mu$m and in particular smaller than 0.4 $\mu$m. The small surface roughness is attained, after application of the hard-material layer, by microfinishing, in particular by honing or lapping, where microfinishing is carried out in pairs with the surfaces to be finished rubbing against other such that an exact mutual matching over the entire surface is achieved, wherein however only these two individual surfaces fit together and produce the necessary sealing action.

According to a preferred embodiment of the invention it is provided that the contact surface of the device has a width in the direction of movement of the device, which is smaller than that of the sealing body, with the remaining area of the surface facing the device being arranged somewhat to the rear. In this manner it is realized that the sealingly abutting surfaces are only as wide as necessary and do not extend over the overall width of the wall of the annular sealing body. Further, foreign matter is forced out of the area of the sealing surfaces.

BRIEF DESCRIPTION OF THE DRAWINGS

Hereunder an embodiment of the invention is explained in detail with reference to the drawings in which:

FIG. 1 shows a cross-section of the shutoff device,

FIG. 2 shows a view of the shutoff device in the direction indicated by arrow II of FIG. 1.

DESCRIPTION OF THE PREFERRED EMBODIMENTS

Figure 3:
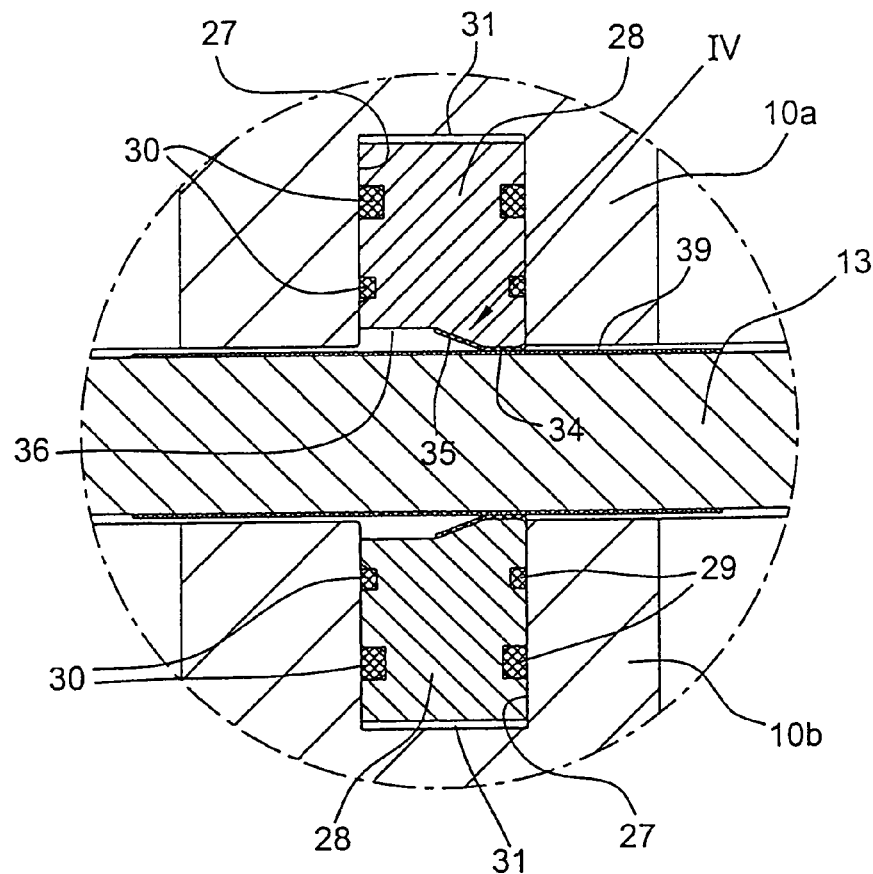
FIG. 3 shows an enlarged representation of detail II of FIG. 1.
Figure 4:
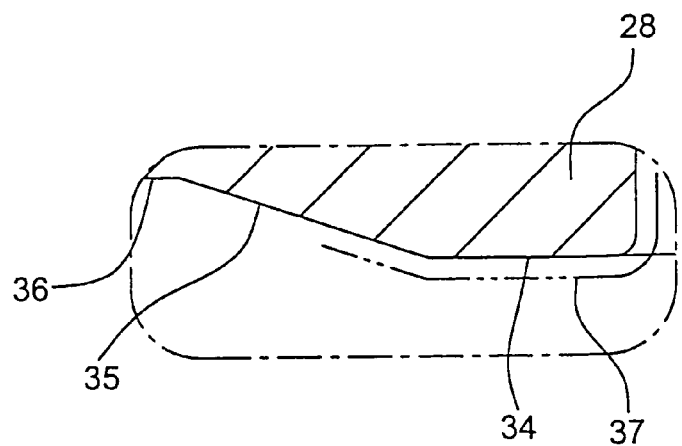
FIG. 4 shows an enlarged representation of detail IV of FIG. 3.

The shutoff device shown comprises a housing 10 composed of two housing halves 10a,10b which axially bear against each other and are screwed to each other. The housing halves are provided with bores aligned with each other and forming a passage 11. At each end of the housing halves a flange 12 is provided for flange-mounting a conduit. Between the housing halves an elongate cavity is formed in which a plate-shaped device 13, which is provided with an opening 14 of approximately the same size as the passage 11, is adapted to be displaced transversely to the axial direction of the housing. The housing 10 comprises, in the plane of the device 13, two receiving spaces 15, 16 extending to opposite sides, one of the receiving spaces being capable of accommodating one half of the device 13 while the other half is located within the housing 10. At the outer end of the receiving space 16 a pneumatic cylinder 18 is fastened via rods 17, said cylinder including a piston 19. The pneumatic cylinder is controlled by a valve 20 which is connected to a compressed air source (not shown). To the piston 19 a piston rod 21 is connected which extends into the end of the receiving space 16 and is connected at its other end with the device 13. The passage of the piston rod 21 through the end wall 22 of the receiving space 16 is sealed with the aid of a stuffing box packing 23.

In the present embodiment, the receiving spaces 15,16 are provided with shielding walls 24 to protect the walls of the shutoff device against heat radiation.

FIG. 1 shows the device 13 in its shutoff position in which the opening 14 is located in the receiving space 15, while the housing 10 includes the closed plate region of the device 13 which shuts off the passage 11. In this closed position the piston rod 21 is moved out of the pneumatic cylinder 18. If the device 13 is to be moved into the open position, the piston 19 is retracted in the cylinder 18 such that the opening 14 of the device 13 extends coaxially to the passage 11.

The passage 11 between the housing 10 and the device 13 is sealed by two annular seals 25,26 each of which is included in one housing half 10a,10b. For this purpose, each housing half comprises an annular fluid cylinder 27 (FIG. 3) which is configured as an axial groove in the housing half. Each fluid cylinder 27 includes an annular rigid sealing body 28 which forms an annular piston. The annular pistons 28 surround the passage 11 on each side of the device 13. Each sealing body 28 comprises on its inside two sealing rings 29 and on its outside two sealing rings 30 adapted for sealing towards the pneumatic annular fluid cylinder 27. At the outer end 31 a pressure line 32 and 33, respectively, extends into each fluid cylinder 27 to advance the sealing body 28 towards the device 13.

Each sealing body 28 comprises, on the side facing the device 13, a contact surface 34. This surface is narrower than the width of the sealing body and merges via an inclined shoulder 35 with an area 36 arranged somewhat to the rear. The contact surface 34 shaped as an annular disk is located at the sealing body 28 at the end adjacent to the the passage 11, while the area 36 is located remote from the passage.

The contact surface 34 is coated with a hard-material layer 37 which extends over a portion of the inclined shoulder 35.

Figure 5:
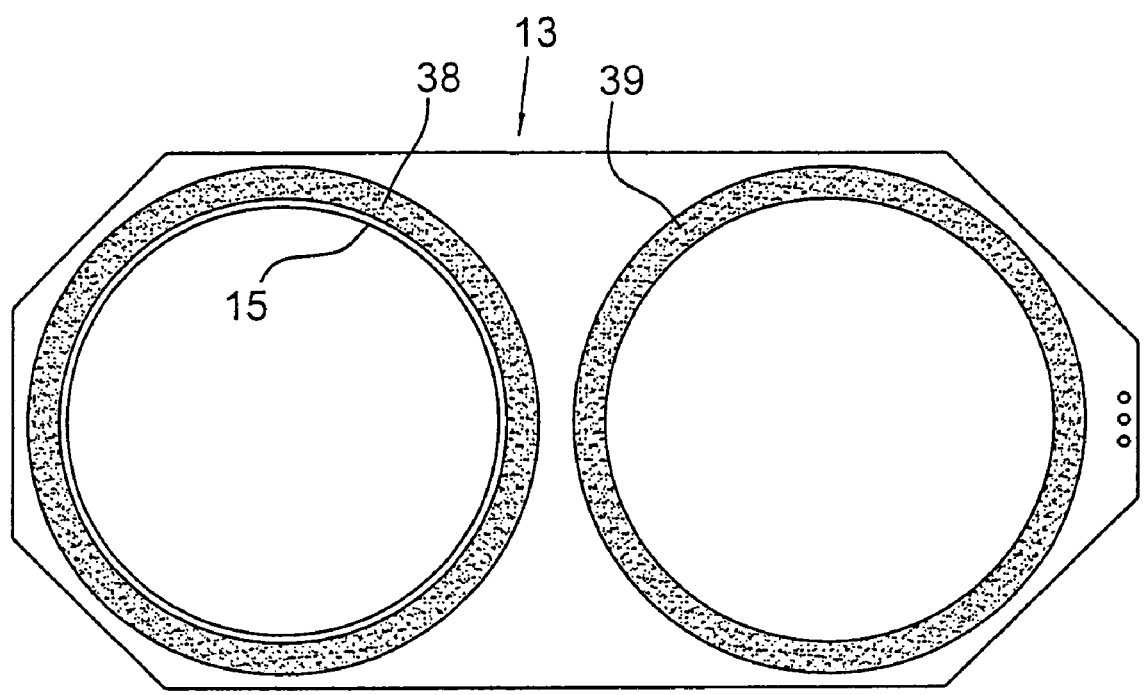
FIG. 5 shows a front view of the device.

The device 13 is on each of its two sides provided with two hard-material layers 38,39 (FIG. 5). These hard-material layers 38,39 are shaped as annular disks. One of the hard-material layers 38 is arranged around the opening 14 of the device 13, and the other hard-material layer 39 is arranged around the closing surface of the device, which is located inside the passage 11 of the housing when the device is in the closed position, as shown in FIGS. 1 and 2.

The hard-material layers 37,38,39 are preferably made from ceramic material, such as chromium dioxide, or from hard metal, such as tungsten carbide. Subsequent to their application, the layers are subjected to microfinishing, i.e. first to grinding and then to honing or lapping. The roughness amounts to max. Ra 4 which corresponds to 4 $\mu$m. In particular, the roughness amounts to approximately Ra 0.4, i.e. 0.4 $\mu$m, and less. The width of the contact surface 34 amounts to less than 10 mm, and in particular to approximately 5 mm. The width should not be larger than required for producing the sealing action.

Microfinishing of the surfaces of the hard-material layers is carried out by lapping in pairs, wherein two hard-material layers are placed one upon the other and rubbed against each other. These two hard-material layers are those of the device 13 and the associated sealing body. Those hard-material layers which are adapted to later sealingly bear against each other are finished by being rubbed against each other such that the hard-material layers fit together in pairs.

Pressure application to the sealing bodies 28 is effected from the cylinder 18. From the control valve 20 a line 40 extends to the rear end of the cylinder 18. This line serves for generating in the cylinder 18 a force acting upon the piston 19, said force driving the device 13 into the closed position. The line 40 is connected via further lines 41,42,43 with a distributor 44 to which the lines 32 and 33 are connected. When pressure is applied to the cylinder 18, first the device 13 is moved into the closed position, and subsequently the sealing bodies 28 are pressed against the device from opposite sides. This pressing is effected in a yielding manner. This means that the sealing bodies 28 follow any deformation or displacement of the device with the sealing action being maintained.

Another line 45, which extends from the valve 20 into the front end of the cylinder 18, serves for setting the piston 19 into the retraction position, whereby the device 13 is moved into the open position.

The shutoff device according to the invention is suitable for use in conjunction with aggressive and abrasive media and for use at high temperatures. The edge of the opening 14 can be configured as a blade such that any foreign matter, which gets stuck when the device is in the open position, is cut up when the device is moved. Such a blade need only be present at the half of the device opening 14 facing the cylinder 18, while the other half may be of blunt configuration.

Although a preferred embodiment of the invention has been specifically illustrated and described herein, it is to be understood that minor variations may be made in the apparatus without departing from the spirit and scope of the invention, as defined by the appended claims.

What is claimed is:

1. A shut-off device for shutting-off and opening flow through a conduit comprising a housing (10) provided with a passage (11), a device (13) movable in said housing (10), said device (13) having an opening portion which registers with said passage (11) in a first position and a closing portion which registers with said passage (11) in a second position, an opening (14) in said opening portion, an annular sealing body (28) arranged around the passage (11) on each side of the device (13), each annular sealing body (28) having a contact surface (34) which contacts a contact surface (38, 39) on each side of the device (13) at the respective opening and closing portions thereof in the first and second positions, the device contact surfaces (38, 39) being a hard material layer which is harder than the material of the device (13) and has a surface roughness of less than 10 $\mu$m, said device contact surfaces (38, 39) are each of a substantially annular configuration, one of said annular device contact surfaces (38) at each side of said device (13) at said opening portion substantially surrounds said opening (14) in said first position, and another of said annular device contact surfaces (39) at each side of said device (13) at said closing portion seals against said annular sealing body contact surfaces (34) in said second position.

2. The shut-off device as defined in claim 1 wherein each of said annular sealing body contact surfaces (34) includes a hard material layer (37) which is harder than the material of the device (13).

3. The shut-off device as defined in claim 1 wherein each of said annular sealing body contact surfaces (34) includes a hard material layer (37) which is harder than the material of the device (13) and has a surface roughness of substantially 4 $\mu$m.

4. The shut-off device as defined in claim 1 wherein each of said annular sealing body contact surfaces (34) is located substantially immediately adjacent said passage (11), and an inclined shoulder (35) merges with an outwardmost portion of each of said annular sealing body contact surfaces (34).

5. The shut-off device as defined in claim 1 wherein each of said annular sealing body contact surfaces (34) is located substantially immediately adjacent said passage (11), and a rounded shoulder merges with an innermost portion of each of said annular sealing body contact surfaces (34).

6. The shut-off device as defined in claim 1 wherein each of said annular sealing body contact surfaces (34) is located substantially immediately adjacent said passage (11), an inclined shoulder (35) merges with an outwardmost portion of each of said annular sealing body contact surfaces (34), and a rounded shoulder merges with an innermost portion of each of said annular sealing body contact surfaces (34).

7. The shut-off device as defined in claim 4 wherein each of said annular sealing body contact surfaces (34) includes a hard material layer (37) which is harder than the material of the device (13).

8. The shut-off device as defined in claim 7 wherein the hard material layer (37) of said annular sealing body contact surfaces (34) extend at least over a portion of said inclined shoulders (35).

9. The shut-off device as defined in claim 1 wherein the hard material layer (38, 39) is made of one of a ceramic-bonded carbide, a metal-bonded carbide, a ceramic-bonded oxide and a metal-bonded oxide.

10. The shut-off device as defined in claim 1 wherein the surface roughness of the hard material layers (38, 39) is in the range of 0.2 $\mu$m to 4 $\mu$m.

11. The shut-off device as defined in claim 1 wherein the surface roughness of the hard material layers (38, 39) is preferably less than 0.2 $\mu$m.

* * * * *